United States Patent [19]

Blöcker

[11] Patent Number: 5,040,669
[45] Date of Patent: Aug. 20, 1991

[54] DUPLEX CONVEYOR

[75] Inventor: Detlef Blöcker, Königswinter, Fed. Rep. of Germany

[73] Assignee: Protech Automation GmbH, Fed. Rep. of Germany

[21] Appl. No.: 351,616

[22] Filed: May 15, 1989

[30] Foreign Application Priority Data

May 13, 1988 [DE] Fed. Rep. of Germany ....... 3816317

[51] Int. Cl.⁵ ............................................. B65G 13/12
[52] U.S. Cl. ..................................... 198/782; 198/790
[58] Field of Search ....................... 198/790, 782, 780; 193/37, 35 R

[56] References Cited

U.S. PATENT DOCUMENTS

| | | | |
|---|---|---|---|
| 500,127 | 6/1893 | Hawkins et al. | 198/790 |
| 530,333 | 12/1894 | Garland | 198/790 |
| 2,603,315 | 7/1952 | Lee | 198/790 X |
| 2,674,179 | 4/1954 | Harrington | 198/790 X |
| 3,916,136 | 10/1975 | Anderson et al. | 198/790 X |
| 4,008,800 | 2/1977 | Forsyth | 198/782 |
| 4,405,050 | 9/1983 | Fenton, Jr. et al. | 198/782 X |
| 4,479,572 | 10/1984 | Merz | 198/790 X |

FOREIGN PATENT DOCUMENTS

| | | | |
|---|---|---|---|
| 0097513 | 4/1988 | Japan | 198/790 |
| 8000801 | 9/1981 | Netherlands | 198/790 |

Primary Examiner—Joseph E. Valenza
Assistant Examiner—D. Glenn Dayoan
Attorney, Agent, or Firm—Diller, Ramik & Wight

[57] ABSTRACT

A duplex conveyor comprises a pair of relatively spaced parallel bars having mutually facing sides with a plurality of bearing blocks mounted for displacement along each bar. A support roller is rotatably journalled for rotation relative to each bearing block and the support rollers are adapted to underlyingly support a workpiece carrier. The bearing blocks have lateral guide surfaces for cooperatively engaging a workpiece carrier during movement thereof upon rotation of at least one of the support rollers. A drive belt roll is drivingly connected to each support roller, and a drive belt is in driving relationship to each belt roll to drive the support rollers and thereby move the workpiece carrier and a workpiece supported thereupon.

13 Claims, 3 Drawing Sheets

DUPLEX CONVEYOR

BACKGROUND OF THE INVENTION

The invention is directed to a duplex conveyor, namely, a conveyor which supports workpieces of workpiece carriers only along their lateral edges. Accordingly, a duplex conveyor, has two parallel conveyor tracks on which the lateral edges of the same object (workpiece or workpiece carrier) are supported while the central portion of the object is not supported.

DESCRIPTION OF THE RELATED ART

A duplex conveyor of the type to which the present invention refers is disclosed in German Begrauchsmuster 72 16 125 U1. This conventional duplex conveyor is provided with two parallel profile bars upon which bearing blocks are mounted at predetermined spaced distances therealong. Each bearing block has a roller supported thereon. The workpieces are placed directly on to the rollers and can be displaced along the rollers in the lengthwise direction of the duplex conveyor. By mounting the support rollers on displaceable bearing blocks, the bearing blocks can be moved closer or further away from each other to vary the spacing between the rollers and thereby vary the number of rollers in dependence upon the load to be conveyed. A disadvantage of this type of conventional duplex conveyor is that the rollers are not driven and, therefore, workpieces are conveyed either by gravity along an incline roller path, manually or through additional driving means engaging the workpieces or the workpiece carriers. Also, the guidance provided laterally to the workpieces is unsatisfactory in this conventional duplex conveyor.

In German Patent Application 1 756 916 there is disclosed a pallet transport system operating much in the manner of a duplex conveyor wherein the support rollers are driven by V-belts. The support rollers are not displaceable along the length of the system but are rotatably supported on lateral walls of the conveyor. A tension roller is supported or arranged between two adjacent support rollers. Each conveyor system of this type is designed for a special application and can not be rearranged subsequently without considerable constructional changes and attendant increased cost and/or down time.

German Patent Application 3 818 584 discloses a duplex conveyor in the form of a belt conveyor in which two profile bars extend generally parallel to each other with their mutually facing sides being provided with running bars. The upper surfaces of the running bars have a coating of low coefficient of friction material and support thereupon the upper flight of a conveyor belt which in turn functions as the carrying and conveying element for workpieces or workpiece carriers.

SUMMARY OF THE INVENTION

The present invention provides an improvement in a conventional duplex conveyor utilizing driven support rollers and effects exact guiding of the workpiece carriers so that the duplex conveyor can be used at an assembly station for performing precise assembly operations on workpieces carried by the workpiece carriers.

In the duplex conveyor of the present invention, the support rollers are carried by bearing blocks which are displaceable along generally parallel profile bars. The support rollers, or at least some of them, are connected to belt rolls which are connected to belt rolls which are in turn driven by driving belts. The driving belts are at least partially entrained over the belt rolls of a plurality of bearing blocks which can be positioned independently of each other along the profile bars. The bearing blocks are also provided with notches defining lateral guiding surfaces for lateral edges of the workpiece carriers which might be, for example, pallets. The bearing blocks are, of course, spaced from each other distances shorter than the overall length of the workpiece carrier/pallets and, thus, each workpiece is continuously laterally guided as it moves between and along the successive bearing blocks through the entire conveying process. In this respect, it is to be considered that turning movements of the pallets/workpiece carrier can primarily occur in the areas in which a driving motion is effected by the support rollers. In these areas. i.e., at the bearing blocks, the guiding surfaces are arranged to maintain the orientation of the pallets/workpiece carriers and to prevent such turning movements.

A particular advantage of the invention resides in the fact that the support rollers and belt rolls are supported unilaterally with the belt rolls being arranged at the mutually facing ends of the support rollers. In this manner, the belt rolls are accessible from the inner side of the duplex roller conveyor, thus allowing easy changing of the drive belt.

With the above and other objects in view that will hereinafter appear, the nature of the invention will be more clearly understood by reference to the following detailed description, the appended claims and the several views illustrated in the accompanying drawings.

DESCRIPTION OF THE PREFERRED EMBODIMENT

Figure 1:
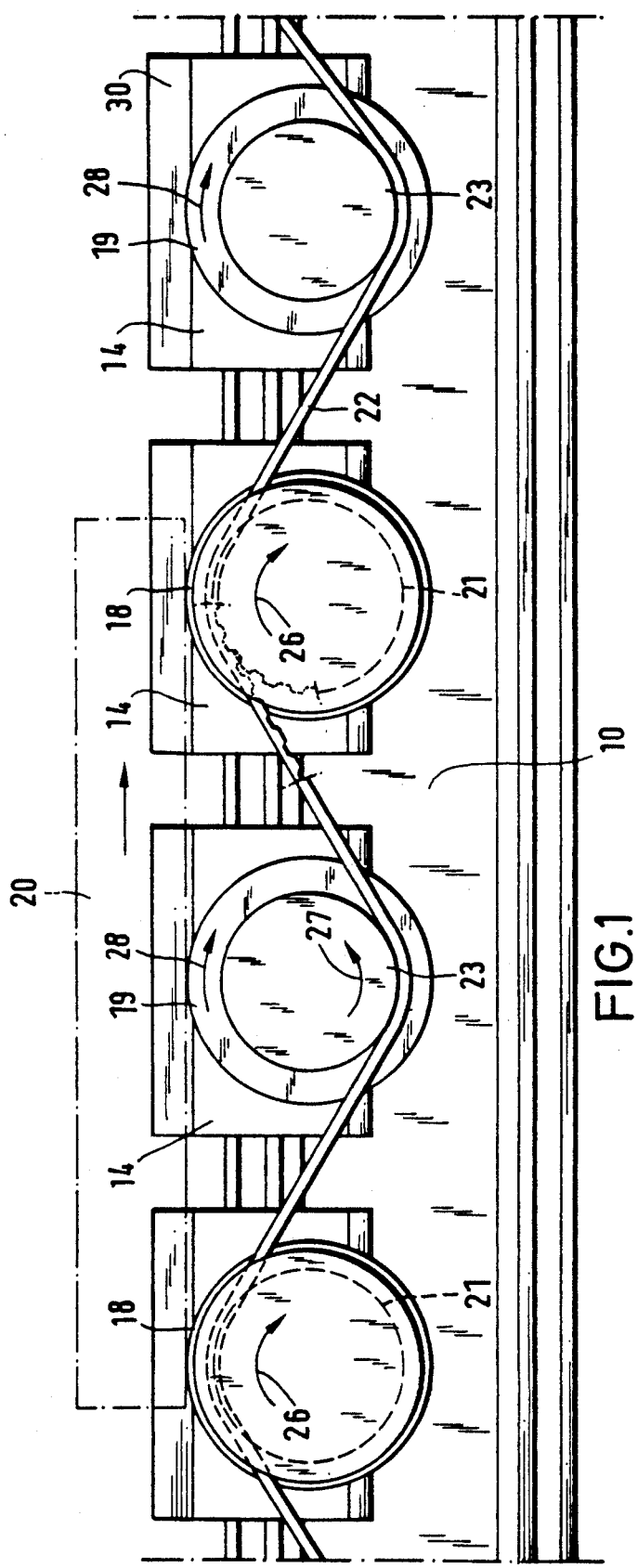
FIGURE 1 is a side elevational view of a novel duplex conveyor of the present invention as viewed from the direction of the arrow I in FIG. 2, and illustrates a series of bearing blocks carrying support rollers, guide rollers and drive belt rolls, the latter of which are partially entrained by a toothed belt to impart motion to workpieces or workpiece carriers.
Figure 2:
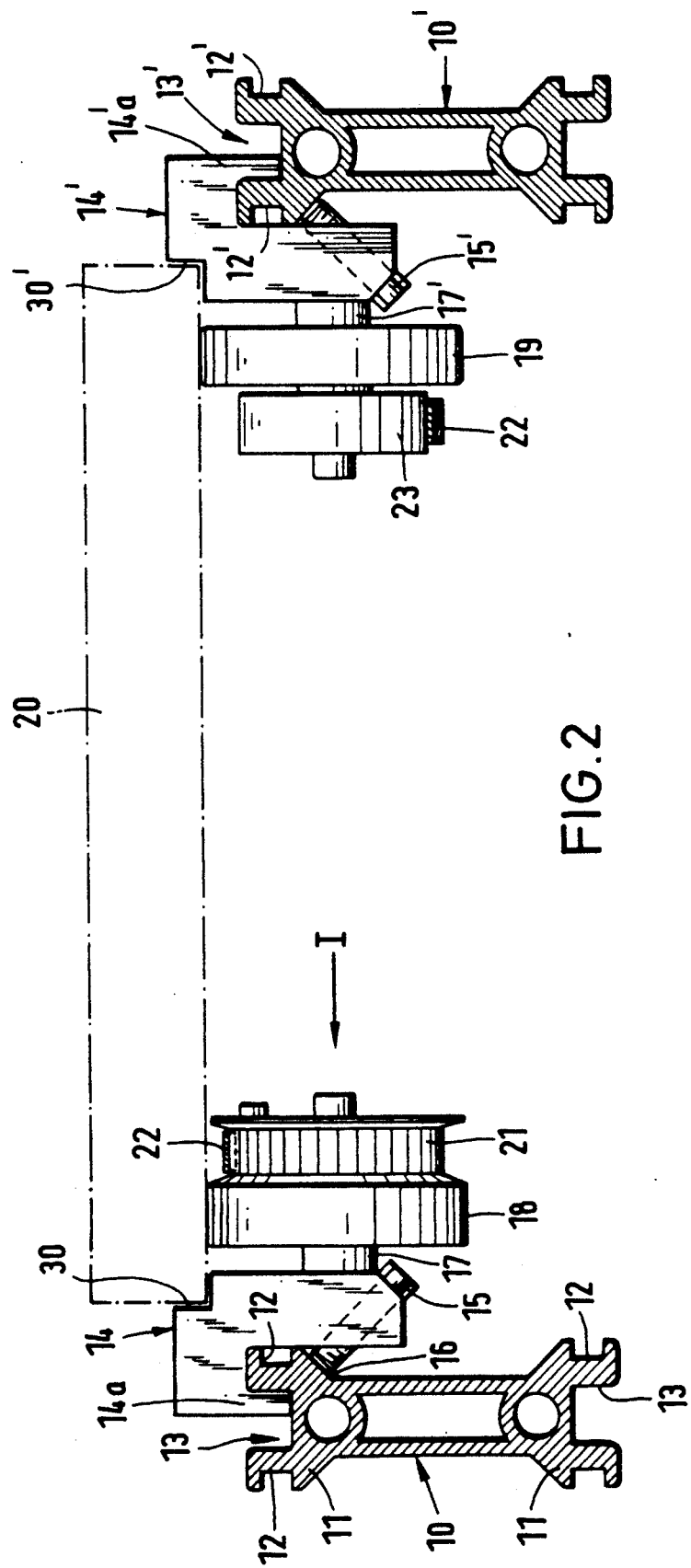
FIG. 2 is a transverse cross-sectional view taken generally normal to FIG. 1, and illustrates two profile bars, a bearing block carried by each profile bar, a support roller and belt drive roll carried by one bearing block, and a support roller and guiding roller carried by the other bearing block with a workpiece carrier shown in phantom outline.

A novel duplex roller conveyor of the present invention is fully illustrated in FIGS. 1 and 2 of the drawings, and includes two spaced parallel profile bars 10, 10' which extend longitudinally and are arranged symmetrical to their vertical and horizontal longitudinal central planes. A head portion 11 is formed at upper and lower ends of each profile bar 10, 10', and each head portion 11 has two grooves, 12, 12' formed therein opening toward opposite sides while another groove 13' 13' opens in an upward vertical direction. The profile bars 10, 10' are fastened at supporting means (not shown) and can be arranged, for example, upon a frame, a rack or a table.

Each profile bar 10, 10' has a plurality of bearing blocks 14, 14', respectively, clamped thereto. Each bearing block 14, 14' has a hooked-shaped projection 14a, 14'a projecting into the upper groove 13, 13, respectively of the head portions 11' and filling half of the width thereof. A vertical wall (unnumbered) of the bearing blocks 14, 14' abuts the side wall (unnumbered) of the head portion 11 so that the bearing blocks 14, 14' can be placed from above onto one of the halves of the head portion 11 or, respectively, can be hung into the profile bars 10, 10', and is then displaced therealong. Each bearing block 14, 14' can be fixed along its profile bar 10, 10' by clamping means in the form of clamping members or bolts 15, 15'. The bolts 15, 15' engage in threaded bores (unnumbered) in the bearing blocks 14, 14' and press against an oblique surface 16 of the head 11 from below which urges the hook 14a, 14'a against a bottom wall and a side wall (each unnumbered) of the grooves 13, 13'.

An axle 17, 17' projects inwardly from the respective bearing blocks 14, 14' toward and in alignment with each other. The axle 17, 17' supports support rollers 19, respectively. thereon. The support rollers 18, 19 differ in that the support rollers are driven in the manner to be described more fully hereinafter to drive or move a workpiece carrier 20, whereas the support rollers 19 are idle, nondriving, nondriven rollers. Each of the driving rollers 18 is firmly connected/fixed to a belt drive roll 21 which is positioned at the inner side or inside of the support roller 18. The belt drive roll 21 and the support roller 18 are fixed to each other but both are preferably journalled by bearings (not shown) for rotation relative to the axle 17. In the case of the support roller 19, this roller freely rotates relative to the axle 17' and a guide roller 23 also freely rotates relative to the axle 17' and is not in any fashion connected or otherwise associated with the support roller 19. In other words, the guide roller 23 rotates independently of the support roller 19.

The belt drive roller 21 is preferably a toothed roller whose teeth (unnumbered) engage a toothed driving or timing belt 22. The driving belt 22 is also partially entrained about the guide rollers 23.

As is best illustrated in FIG. I, the driving belt 22 at each side of the duplex conveyor runs alternately along the upwardly directed circumferential portion of each driving roll 21 and then along the downwardly directed circumferential portion of a non-driving guide roller 23. Since all belt rolls at the profile bars 10 and 10' are arranged at the same height, the driving belt 22 takes on a wave shaped configuration, as is evident in FIG. 1. The driving surface of the belt 22, which has the teeth heretofore noted, engages the teeth of the driving belt rolls 18 while the opposite or backside of the driving belt 22 is devoid of teeth and its smooth surface (unnumbered) merely abuts against the periphery of each of the guide rollers 23. In FIG. 1 the arrows 26 indicate the directions of rotation of the belt rolls 21 and the arrows 27 indicate the direction of rotation of the guide rollers 23. The directions of rotation of the nondriven support rollers 19 during transport of the workpiece carrier 20 are indicated by arrows 28. It can be seen that the guide rollers 23 are driven by the driving belt 22 in a direction opposite to the conveying direction of the workpiece carrier 20 and rotate in opposite direction to the associate support roller 19, respectively.

The workpiece carrier/pallet 20 preferably has a flat bottom side resting on the support rollers 18 and 19. The workpiece carrier 20 extends in a lengthwise direction for a distance at least equal to the distance between two adjacent support rollers 18, 19, such that the workpiece carrier 20 is supported by at least one driven support roller 18 in each position. The support rollers 19 only support the workpiece carrier 20 and rotate by engagement with the workpiece carrier 20 but are not driven in any fashion. The latter is most evident from the support roller 19 illustrated in FIG. 2.

Mutually facing inner sides of the bearing blocks 14, 14' have their upper ends provided with a recess defining lateral guiding surfaces 30, 30', respectively. The bearing blocks 14, 14' project upwardly beyond the support rollers 18, 19 and the lateral guiding surfaces 30, 30', are arranged in such a manner that the workpiece carrier 20, by its lateral edges, projects into the recesses 30, 30' and is guided thereby as it moves from left-to-right in the direction of the arrow associated therewith in FIG. 1.

The outer diameters of the support rollers 18, 19 are larger than the outer diameters of the outer surfaces of the belt rolls 21 and the guide rollers 23. Because of the latter, the driving belt 22 cooperates with the belt drive rolls 21 and the non-driving guide rolls 23 without the driving belt 22 contacting the workpiece carrier 20, as it also most apparent from FIG. 2.

Figure 3:
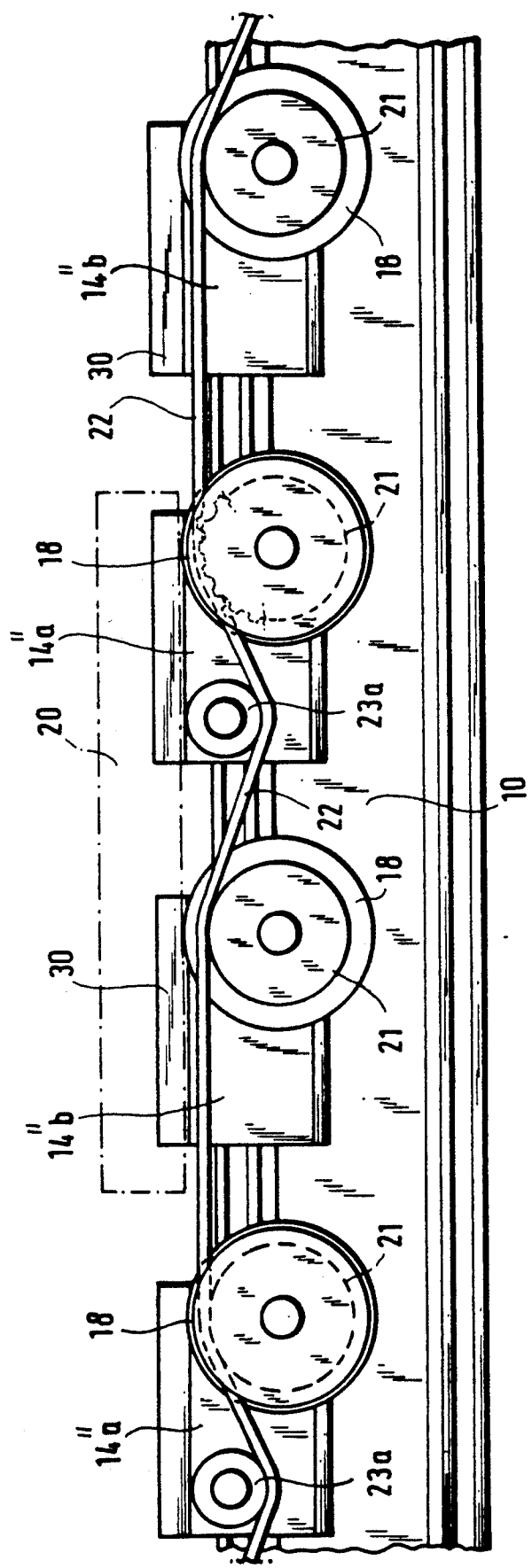
FIGURE 3 is a side elevational view of another duplex conveyor similar to FIG. 1, and illustrates bearing blocks each carrying a pair of rollers in the form of a support roller and a belt drive roll with at least selected ones of the bearing blocks also carrying a guide roller.

Reference is now made to FIG. 3 of the drawings which illustrate another embodiment of the invention which includes first bearing blocks 14"a, and second bearing blocks 14"b; which are arranged in an alternating fashion at spaced predetermined distances to each other along each of the guide rails 10, 10', though only the former is illustrated. Each of the first bearing blocks 14"a is provided with a pair of rollers consisting of a support roller 18 and a belt roll 21 firmly connected to each other, and further with a freely idling guide roller 23a which acts only to guide and not drive. The guide roller 23a presses downwardly from above against the untoothed backside of the toothed driving belt 22 and causes the toothed driving belt 22 to be curved downwardly before entraining about the belt drive rolls 21 of the same and adjacent bearing blocks 14"a.

Between each two of the first bearing blocks 14"a, respectively, there is arranged a second bearing block 14"b which only supports a pair of rollers consisting of a support roller 18 and a belt driving roller 21 fixedly connected thereto. Between a first bearing block 14"a and a second bearing block 14"b, the driving belt 22 extends horizontally, and between a second bearing block 14"b and a first bearing block 14"a, respectively, the guide roller 23a, guiding the driving belt 22 effects downward deflection of the driving belt 22 so that the same not only tangentially touches the adjoining driving belt roll 21 but also runs along the driving belt rolls 21 for a defined short portion of their circumference. Thus, each guide roller 23a for guiding the driving belt 22 is provided only in every second intermediate space between two of the belt rolls 21, but this is sufficient to safeguard the driving connection between the driving belt 22 and all of the belt rolls 21.

An alternative to the construction just described would be that of providing all of the bearing blocks 14"a with guide rollers 23a, but this would necessitate a long length of drive belt and the belt would be deflected and deformed more often. Also, the number of the guide rollers would, obviously, be increased in this arrangement, adding to the cost of the overall duplex conveyor. Since the belt driving rolls 21 are all arranged at the same height and are of the same diameter, the driving belt 22 extends horizontally between every two belt rolls 21 which have no guide roller 23a arranged therebetween, whereas between two belt rolls 21 which have a guide roller 23a arranged therebetween, the driving belt 22 is pressed or deflected substantially downwardly in a generally V-shaped configuration, as is self evident from FIG. 3. In the described arrangement of the first bearing blocks 14"a and the second bearing blocks 14"b, the driving belt 22 is guided downwardly only in every second intermediate space between two adjacent belt driving rolls 21 while the driving belt 22 extends horizontally across the remaining intermediate spaces.

Although a preferred embodiment of the invention has been specifically illustrated and described herein, it is to be understood that minor variations may be made in the apparatus without departing from the spirit and scope of the invention, as defined in the appended claims.

I claim:

1. A duplex conveyor comprising a pair of relatively spaced parallel bars having mutually facing sides, a plurality of bearing blocks mounted for displacement along each bar, means for securing each bearing block at a selected position of displacement along its bar, means for rotatably journalling a support roller relative to each bearing block, said support rollers being adapted to underlyingly support a workpiece carrier, said bearing blocks having lateral guide surface means for cooperatively guiding a workpiece carrier during movement upon rotation of at least selected ones of said support rollers, means for rotating said selected support rollers, said rotating means include a drive belt roll drivingly connected to each selected support roller, said support rollers and drive belt rolls of one of said parallel bars being supported and driven independently of the support rollers and drive belt rolls of the other of said parallel bars, an independent driving belt along each of said parallel bars in driving relationship to each associated drive belt roll, each driving belt including a drive belt run having drive and opposite surfaces, each said drive belt run-drive surface being in driving relationship with an associated drive belt roll, and each said drive belt run opposite surface being in contacting relationship with an associated guide roller.

2. The duplex conveyor as defined in claim 1 wherein said selected support rollers have mutually facing inner sides, and said drive belt rollers are located at said mutually facing inner sides of said selected support rollers.

3. The duplex conveyor as defined in claim 1 including an additional support roller and an associated guide roller arranged between two of said first-mentioned support rollers and drive belt rolls along at least one said bars, said last-mentioned two drive belt rolls and guide roller being generally aligned along said one bar, one of said drive belts having drive and opposite surfaces, said one drive belt drive surface being in driving relationship with said two first-mentioned drive belt rolls, and said one drive belt opposite surface being in contacting relationship with said associated guide roller.

4. The duplex conveyor as defined in claim 1 including an additional support roller and an associated guide roller arranged between two of said first-mentioned support rollers and drive belt rolls along at least one of said bars, said additional support roller and associated guide roller being mounted for free rotation relative to each other, said last-mentioned two drive belt rolls and guide roller being generally aligned along said one bar, one of said drive belts having drive and opposite surfaces, said one drive belt drive surface being in driving relationship with said two first-mentioned drive belt rolls, and said one drive belt opposite surface being in contacting relationship with said associated guide roller.

5. The duplex conveyor as defined in claim 1 wherein at least one bearing block of each bar is positioned between two of said bearing blocks each carrying one of said support rollers and drive belt roll, and each said at least one bearing block carrying only two rollers comprised of a support roller and a belt roll.

6. The duplex conveyor as defined in claim 1 wherein each driving belt is a toothed belt.

7. The duplex conveyor as defined in claim 1 wherein each drive belt is a toothed belt and each drive belt roll is a toothed roll.

8. The duplex conveyor as defined in claim 1 wherein at least one of said drive belt rolls carried by one of the bearing blocks of one of said pair of parallel bars is driven independently of at least one of said drive belt rolls carried by one of the bearing blocks of the other of said pair of parallel bars.

9. The duplex conveyor as defined in claim 1 including an idling guide roller carried by at least one other of said support rollers, and at least one of said drive belt rolls carried by a bearing block of one of said pair of parallel bars is in general alignment with said idling guide roller of said at least one other support roller carried by a bearing block of the other of said pair of parallel bars.

10. The duplex conveyor ad defined in claim 8 including an idling guide roller carried by at least one other of said support rollers, and at least one of said drive belt rolls carried by a bearing block of one of said pair of parallel bars is in general alignment with said idling guide roller of said at least one other support roller carried by a bearing block of the other of said pair of parallel bars.

11. A duplex conveyor comprising a pair of relatively spaced parallel bars having mutually facing sides, a plurality of bearing blocks mounted for displacement along each bar, means for securing each bearing block at a selected position of displacement along its bar, means for rotatably journalling a support roller relative to each bearing block, said support rollers being adapted to underlyingly support a workpiece carrier, said bearing blocks having lateral guide surface means for cooperatively guiding a workpiece carrier during movement upon rotation of at least selected ones of said support rollers, means for rotating said selected support rollers, said rotating means include a drive belt roll drivingly connected to each selected support roller, a driving belt in driving relationship to each drive belt roll, at least one guide roller supported for rotation by one of said bearing blocks, said one guide roller being generally aligned with the drive belt roll carried by said one bearing block, one of said drive belts having drive and opposite surfaces, said one drive belt drive surface being in a driving relationship with said last-mentioned drive belt roller, and said one drive belt opposite surface being in contacting relationship with said at least one guide roller.

12. A duplex conveyor comprising a pair of relatively spaced parallel bars having mutually facing sides, at least three bearing blocks mounted for displacement along each bar, means for securing each bearing block at a selected position of displacement along its bar, a first of said bearing blocks being positioned between a second and a third of said bearing blocks along each bar, each first bearing bock carries a support roller and a guide roller, said support roller and guide roller of each first bearing block being journalled for rotation relative to each other, each said second and third bearing block carries a support roller and a drive belt roll, said last-mentioned support roller and drive belt roll being connected to each other for simultaneous rotation, said drive belt rolls and guide roller being generally aligned, a driving belt, said driving belt having a first driving surface and a second opposite surface, said belt first driving surface being in driving contact with said drive belt rolls of said second and third bearing blocks, and said driving belt opposite surface being in contact with said guide roller.

13. A duplex conveyor comprising a pair of relatively spaced parallel bars having mutually facing sides, at least three bearing blocks mounted for displacement along each bar, means for securing each bearing block at a selected position of displacement along its bar, a first of said bearing blocks being positioned between a second and a third of said bearing blocks along each bar, each first, second and third bearing blocks carries a support roller and drive belt roll, said support roller and drive belt rolls of each first, second and third bearing blocks being connected to each other for simultaneous rotation, each said second and third bearing block carries a guide roller, said drive belt, said driving belt having a first driving surface and a second opposite surface, said belt first driving surface being in driving contact with said rive belt rolls of said first, second and third bearing blocks, and said driving belt opposite surface being in contact with said guide rollers of said second and third bearing blocks.

* * * * *